(12) United States Patent
Colonna et al.

(10) Patent No.: US 10,375,516 B2
(45) Date of Patent: **\*Aug. 6, 2019**

(54) METHOD AND SYSTEM FOR A REAL-TIME COUNTING OF A NUMBER OF PERSONS IN A CROWD BY MEANS OF AGGREGATED DATA OF A TELECOMMUNICATION NETWORK

(71) Applicant: TELECOM ITALIA S.p.A., Milan (IT)

(72) Inventors: Massimo Colonna, Turin (IT); Marco Mamei, Reggio Emilia (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/559,502

(22) PCT Filed: Mar. 30, 2015

(86) PCT No.: PCT/EP2015/056878
§ 371 (c)(1),
(2) Date: Sep. 19, 2017

(87) PCT Pub. No.: WO2016/155769
PCT Pub. Date: Oct. 6, 2016

(65) Prior Publication Data
US 2018/0124566 A1    May 3, 2018

(51) Int. Cl.
*H04W 24/00* (2009.01)
*H04W 4/021* (2018.01)
*H04W 4/029* (2018.01)
*H04W 88/02* (2009.01)

(52) U.S. Cl.
CPC .......... *H04W 4/022* (2013.01); *H04W 4/029* (2018.02); *H04W 88/02* (2013.01)

(58) Field of Classification Search
CPC ...... H04W 4/022; H04W 4/029; H04W 88/02
See application file for complete search history.

(56) References Cited

U.S. PATENT DOCUMENTS

| 2003/0009239 A1* | 1/2003 | Lombardo | ............. G16H 10/60 700/30 |
| 2013/0194980 A1* | 8/2013 | Yin | ....................... H04L 1/1607 370/280 |

(Continued)

OTHER PUBLICATIONS

International Search Report and Written Opinion dated Oct. 23, 2015, in PCT/EP2015/056878 filed Mar. 30, 2015.

(Continued)

*Primary Examiner* — Barry W Taylor
(74) *Attorney, Agent, or Firm* — Oblon, McClelland, Maier & Neustadt, L.L.P.

(57) ABSTRACT

A method of estimating a number of persons gathering at an Area of Interest during a time interval on a day, wherein the Area of Interest is defined by an Area of Interest center and an Area of Interest radius and is covered by a mobile telecommunication network including plural communication stations each of which is configured to manage communications of user equipment in one or more served areas in a covered geographic region over which the mobile telecommunication network extends.

21 Claims, 8 Drawing Sheets

(56) References Cited

U.S. PATENT DOCUMENTS

| | | | | |
|---|---|---|---|---|
| 2013/0325856 | A1* | 12/2013 | Soto Matamala | H04W 4/21 707/724 |
| 2014/0031055 | A1* | 1/2014 | Do | H04W 16/18 455/456.1 |
| 2015/0019294 | A1* | 1/2015 | Milton | G06Q 30/0205 705/7.34 |
| 2015/0100619 | A1* | 4/2015 | Flores Miranda | H04W 74/0866 709/201 |
| 2017/0150504 | A1* | 5/2017 | Soldati | H04W 72/0406 |
| 2017/0359731 | A1* | 12/2017 | Soldati | H04W 16/14 |

OTHER PUBLICATIONS

Esteban Moro et al., "Book of Abstracts:: Oral", Internet URL:http://www.netmob.org/assets/img/netmob15_book_of_abstracts_oral.pdf, MIT MediaLab, Apr. 7-10, 2015, 132 pages, XP055209546.

Laura Ferrari et al., "Discovering events in the city via mobile network analysis", Journal of Ambient Intelligence and Humanized Computing, vol. 5, No. 3, Nov. 24, 2012, pp. 265-277, XP035318373.

Mir J. Darakhshan J et al., "DP-WHERE: Differentially Private Modeling of Human Mobility", IEEE International Conference on Big Data, Oct. 6, 2013, pp. 580-588, XP032535074.

\* cited by examiner

METHOD AND SYSTEM FOR A REAL-TIME COUNTING OF A NUMBER OF PERSONS IN A CROWD BY MEANS OF AGGREGATED DATA OF A TELECOMMUNICATION NETWORK

BACKGROUND OF THE INVENTION

Field of the Invention

The present invention relates to crowd counting, i.e. to techniques for counting or estimating the number of persons in a crowd. In the present description and for the purposes of the present invention, by "crowd" it is meant a gathering of a certain number of people, gathered in a certain location for, e.g., attending at public events or happenings, of the most disparate nature, like for example (and non-exhaustively) live television public happenings, artistic/entertaining performances, cultural exhibitions, theatrical plays, sports contests, concerts, movies, demonstrations and/or for visiting a place of particular interest such as for example a museum, a monument, a building, and so forth.

Particularly, the present invention relates to crowd counting techniques exploiting information provided by wireless or mobile telecommunication networks.

Overview of the Related Art

In the tasks of urban planning, management of activities (e.g., transport systems management and emergencies management), and tourism and local marketing, it is useful to have a knowledge of amounts of people who gathered at certain locations or Areas of Interest (AoI for short, e.g., a building, such as for example a stadium or a theatre or a cinema, the surroundings thereof, a square or a street(s) of a city or town or village, a district etc.), e.g. because they attended at public happenings like shows (e.g., related to culture, entertaining, politics or sports) that took place within the Area of Interest and/or for visiting a place of interest (also denoted as point of interest) within the Area of Interest.

In case of one or more gatherings of people related to public happenings, although the following considerations apply to gatherings of people related to points of interest as well, this knowledge allows for example a more effective planning of subsequent public happenings of the same type. Particularly, this knowledge allows a more effective planning and managing of resources and activities (such as infrastructures, transport system and security) directly or indirectly related to similar public happenings that may take place in the future (such as for example sports matches that regularly take place at a stadium). Moreover, from a commercial viewpoint, this knowledge allows a better management of marketing activities intended to promote similar events that may take place in the future.

Nowadays, mobile communication devices (referred to as mobile phones or UE in the following, including cellular phones, smartphones, tablets and the like) have reached a thorough diffusion among the population of many countries, and mobile phone owners almost always carry their mobile phones with them. Since mobile phones communicate with a plurality of base stations of the mobile phone networks, and each base station covers (i.e., serves) one or more predetermined serving areas, or cells, which are known to the mobile communication services provider (e.g., mobile phone network owner or virtual mobile phone services provider), mobile phones result to be optimal candidates as tracking devices for collecting data useful for identifying the amount of people who attended to one or more public happenings.

In the art, many systems and methods have been proposed in order to collect information about time and locations at, and in which, a User Equipment (UE, e.g. a mobile phone, a smartphone, a tablet, etc.) of an individual connects to the mobile phone network (e.g., for performing a voice call or sending a text message), and use such collected information in order to derive information related to how many attendees a certain public happening had.

For example, F. Calabrese, F. C. Pereira, G. Di Lorenzo, L. Liu, C. Ratti, "The Geography of Taste: Analyzing Cell-Phone Mobility in Social Events," Pervasive Computing, LNCS 6030, Springer, 2010, pp. 22-37, discloses the analysis of crowd mobility during special events. Nearly 1 million cell-phone traces have been analyzed and associated with their destinations with social events. It has been observed that the origins of people attending an event are strongly correlated to the type of event, with implications in city management, since the knowledge of additive flows can be a critical information on which to take decisions about events management and congestion mitigation.

Traag, V. A.; Browet, A.; Calabrese, F.; Morlot, F., "Social Event Detection in Massive Mobile Phone Data Using Probabilistic Location Inference", 2011 IEEE Third International Conference on Privacy, Security, Risk and Trust (Passat), and 2011 IEEE Third International Conference on Social Computing (Socialcom), pp. 625, 628, 9-11 Oct. 2011, focuses on unusually large gatherings of people, i.e. unusual social events. The methodology of detecting such social events in massive mobile phone data is introduced, based on a Bayesian location inference framework. More specifically, a framework for deciding who is attending an event is also developed. The method on a few examples is demonstrated. Finally, some possible future approaches for event detection, and some possible analyses of the detected social events are discussed.

Francesco Calabrese, Carlo Ratti, "Real Time Rome", Networks and Communications Studies 20(3-4), pages 247-258, 2006, discloses the Real Time Rome project, presented at the 10th International Architecture Exhibition in Venice, Italy. The Real Time Rome project is the first example of a urban-wide real-time monitoring system that collects and processes data provided by telecommunications networks and transportation systems in order to understand patterns of daily life in Rome. Observing the real-time daily life in a town becomes a means to understanding the present and anticipating the future urban environment.

F. Manfredini, P. Pucci, P. Secchi, P. Tagliolato, S. Vantini, V. Vitelli, "Treelet decomposition of mobile phone data for deriving city usage and mobility pattern in the Milan urban region", MOX-Report No. 25/2012, MOX, Department of Mathematics "F. Brioschi", Politecnico di Milano, available at http://mox.polimi.it, discloses a geo-statistical unsupervised learning technique aimed at identifying useful information on hidden patterns of mobile phone use. These hidden patterns regard different usages of the city in time and in space which are related to individual mobility, outlining the potential of this technology for the urban planning community. The methodology allows obtaining a reference basis that reports the specific effect of some activities on the Erlang data recorded and a set of maps showing the contribution of each activity to the local Erlang signal. Results being significant for explaining specific mobility and city usages patterns (commuting, nightly activities, distribution of residences, non systematic mobility) have been selected and their significance and their interpretation from a urban analysis and planning perspective at the Milan urban region scale has been tested.

Ramon Caceres, James Rowland, Christopher Small, and Simon Urbanek, "Exploring the Use of Urban Greenspace through Cellular Network Activity", 2nd Workshop on Pervasive Urban Applications (PURBA), June 2012, discloses the use of anonymous records of cellular network activity to study the spatiotemporal patterns of human density in an urban area. This paper presents the vision and some early results of this effort. Firstly, a dataset of six months of activity in the New York metropolitan area is described. Secondly, a technique for estimating network coverage areas is presented. Thirdly, the used approach in analyzing changes in activity volumes within those areas is described. Finally, preliminary results regarding changes in human density around Central Park are presented.

SUMMARY OF THE INVENTION

The Applicant has observed that, generally, method and systems known in the art provide unsatisfactory results, as they are not able to determine (or have a limited ability in determining) whether a UE owner has been in an Area of Interest (AoI) where one or more public happenings have been held, for attending threat or for other reasons (for example, because the UE owner resides or has a business in proximity of, or within, the area of interest). In addition, the results provided by the known solutions are strongly influenced by the size of the area of interest selected for the analysis of the amount of attendees at the one or more public happenings. In other words, if the area of interest has a large size, a certain number of UE owners that are not actually part of the crowd will be taken into account in the evaluation of the number of people in the crowd. Conversely, if the area of interest has small size, a certain number of UE owners actually part of the crowd will be excluded from the evaluation of the number of persons in the crowd.

Therefore, subsequent planning and managing of resources and activities (of the type mentioned above) based on results obtained by the methods and systems known in the art will achieve a limited efficiency due to the limited accuracy thereof.

Moreover, known methods and systems based on the use of information regarding positions occupied by each UE while connected to the mobile phone network (information that are collected by mobile phone networks serving the UE) could be intrusive of a privacy of the owners of the UE.

Indeed, such information allow knowing habits, routines of, and places (e.g., home and work places) daily frequented by, the UE owners.

Accordingly, the use of such information is thus usually highly restricted (to the extent of being prohibited) by laws issued by many National Authorities in order to protect the privacy of the UE owners.

In this respect, "anonymization" techniques known in the art and used for anonymizing information about the UE owners, in order to circumvent privacy issues, do not grant a satisfactory protection of the privacy thereof.

Generally, the anonymization techniques comprise masking any identifiers (such as for example an International Mobile Equipment Identity—IMEI, an International Mobile Subscriber Identity—IMSI, or a Mobile Subscriber ISDN Number) associated with the UE and/or the UE owner with enciphered identifiers.

Nevertheless, an analysis of the information collected over a plurality of days may be intrusive of UE owners since it anyways allows identifying sensitive information regarding habits, home and work places of the UE owners and, possibly, the UE owners themselves by analyzing such sensitive information so obtained.

The Applicant has thus coped with the problem of devising a system and method adapted to overcome the problems affecting the prior art solutions.

The Applicant has found that it is possible to determine the size of an optimal area of interest on the basis of data related to the UE during the course of the one or more public happening and in a certain number of days preceding the one or more public happening.

Moreover, the Applicant has found that it is possible to protect the privacy of the UE owners by exploiting aggregated data regarding the usage of at least one mobile phone network.

For example, aggregated data exploitable by the present invention comprise a number of UE served by the mobile phone network within one or more time interval (i.e., no information about single UE is provided that may infringe upon UE owner privacy).

Preferably, by using aggregated data regarding separately one or more served areas of the mobile phone network it is possible to determine the size of an optimal area of interest and then a number of people that gathered within it with a high precision.

It should be noted that the knowledge of the number of UE served by the mobile phone network within one or more time interval in the optimal area generally does not correspond to the number of people in the crowd. Indeed, the number of UE served by the mobile phone network within one or more time interval in the optimal area comprise UE owned by people in the optimal area for reasons (e.g., work, people simply crossing the optimal area) other than gathering in the crowd.

The Applicant has further found that it is possible to discern the number of people in the crowd within the optimal area from people that are in the optimal area but are not in the crowd on the basis of the analysis of aggregated data referred to the mobile phone network usage during the gathering and during a number of days previous to the day in which the gathering of people occurred.

Particularly, one aspect of the present invention proposes a method of estimating a number An of persons gathering at an Area of Interest during a time interval on a day, wherein said Area of Interest is defined by an Area of Interest center C and an Area of Interest radius Rs and is covered by a mobile telecommunication network having a plurality of communication stations each of which adapted to manage communications of user equipment in one or more served areas in a covered geographic region over which the mobile telecommunication network provides services, the method comprising the steps of: a) subdividing the covered geographic region in a plurality of surface elements; b) defining a plurality of calculated radius values Rk of the Area of interest radius Rs, and, for each calculated radius value: c) identifying a number of relevant surface elements of the covered geographic region comprised within the Area of interest; d) computing a first number Uk of User Equipment served by the mobile communication network during the time interval [Ts, Te] on the day g within the Area of Interest based on aggregated data $u_{q,t}$ regarding a usage of the mobile communication network; e) computing a second number Upk of User Equipment served by the mobile communication network during the time interval [Ts, Te] for each day gp of a predetermined number of previous P days preceding the day g within the Area of Interest based on the aggregated data $u_{q,t}$ regarding the usage of the mobile communication network; f) combining the first number Uk of User Equipment and the second numbers Upk of User Equipment for obtaining a statistical quantity Zk; g) computing a normalized statistical quantity Z'k by normalizing the statistical quantity Zk with respect to the radii Ra of the relevant served areas; h) computing an optimum radius value Ro of the Area of Interest radius as the average of the calculated radius values weighted by the normalized statistical quantity Z'k; i) estimating the number An of persons gathering within the Area of Interest having the Area of Interest radius Rs equal to the optimum radius value Ro.

Preferred features of the present invention are set forth in the dependent claims.

In one embodiment of the invention, the aggregated data $u_{q,t}$ regarding a usage of the mobile communication network comprise a number of served User Equipment traffic load, number of voice calls, number of SMS transmitted and/or volume of binary data exchanged within preferably each one of the communication stations of the mobile communication network.

In one embodiment of the invention, a surface element is identified as a relevant surface element if it verifies the following inequality:

$$Dist(C,B) \le |Rs+Rk|,$$

where C is the center of the Area of Interest, B is the center of the surface element, Dist(C, B) is the geographical distance between the center of the Area of Interest C and the center of the surface element B, Rs is the radius of the surface element, and Rk is the calculated radius value.

In one embodiment of the invention, the method further comprises for each calculated radius value: j) receiving a plurality of aggregated data $u_{q,t}$ regarding a usage of the mobile communication network referred to each one of said surface elements.

In one embodiment of the invention, the step i) of receiving a plurality of aggregated data $u_{q,t}$ regarding a usage of the mobile communication network for each one of said surface elements, comprises receiving a set $\{u_{q,t}\}$ of aggregated data, each aggregated data $u_{q,t}$ of the set $\{u_{q,t}\}$ of the aggregated data being referred to a respective reference time interval $d_t$ which is a portion of an acquisition period ΔT during which aggregated data $u_{q,t}$ are collected.

In one embodiment of the invention, the step c) of computing a first number Uk of User Equipment served by the mobile communication network during the observation time interval [Ts, Te] on the day g within the Area of Interest based on aggregated data $u_{q,t}$ regarding a usage of the mobile communication network, comprises computing the first number Uk of User Equipment on the basis of sets $\{u_{q,t}\}$ of aggregated data referred to respective reference time intervals $d_t$ comprised within the observation time interval [Ts, Te] on the day g, and wherein the step d) of computing a second number Upk of User Equipment that has been served by the mobile communication network during the observation time interval [Ts, Te] for each day gpn of a predetermined number P of previous days preceding the day g within the Area of Interest based on the aggregated data $u_{q,t}$ regarding the usage of the mobile communication network, comprises computing each second number Upk of User Equipment on the basis of sets $\{u_{q,t}\}$ of aggregated data referred to respective reference time intervals $d_t$ comprised within the observation time interval [Ts, Te] of the respective previous day gpn of the predetermined number P of previous days preceding the day g.

In one embodiment of the invention, the first number Uk of User Equipment and/or each second number Upk of User Equipment may be computed as total number, an average number, or a maximum number of User Equipment in the relevant surface elements comprised in the Area of Interest.

In one embodiment of the invention, the step e) of combining the first number Uk of User Equipment and the second numbers Upk of User Equipment for obtaining a statistical quantity Zk comprises: combining the second number Upk of User Equipment of each one of the previous days gpn in order to determine an average User Equipment number μk and a User Equipment number standard deviation σk.

In one embodiment of the invention, the step e) of combining the first number Uk of User Equipment and the second numbers Upk of User Equipment for obtaining a statistical quantity further comprises: computing the statistical quantity as:

$$Zk=(Uk-\mu k)/\sigma k,$$

wherein Uk is the first number of User Equipment, μk is the average User Equipment number and σk is the User Equipment number standard deviation.

In one embodiment of the invention, the plurality of calculated radius values Rk ranges from a minimum radius value Rmin to a maximum radius value Rmax, each calculated radius value being separated from a next radius value by an iteration width Δ.

In one embodiment of the invention, the step h) of estimating a number An of persons gathering within the Area of Interest having the Area of Interest radius Rs equal to the optimum radius value Ro comprises: k) defining a number of relevant surface elements among the surface elements comprised in the covered geographic region, wherein said relevant surface elements are surface elements at least partially superimposed on the Area of Interest having the Area of Interest radius equal to the optimum radius value.

In one embodiment of the invention, a surface element is identified as a relevant surface element if it verifies the following inequality:

$$Dist(C,B) \le |Rs+Ro|,$$

where C is the center of the Area of Interest, B is the center of the surface element, Dist(C, B) is the geographical distance between the center of the Area of Interest C and the center of the surface element B, Rs is the radius of the surface element, and Ro is the optimum radius value.

In one embodiment of the invention, the step h) of estimating a number An of persons gathering within the Area of Interest having the Area of Interest radius Rs equal to the optimum radius value Ro further comprises: computing a third number $Ul|_{AOI}$ of User Equipment as a number of User Equipment comprised within the relevant surface elements comprised in the Area of Interest having the Area of Interest radius Rs equal to the optimum radius value Ro during the time interval on the basis of the aggregated data $u_{q,t}$ regarding a usage of the mobile communication network.

In one embodiment of the invention, computing a third number $Ul|_{AOI}$ of User Equipment, comprises computing the third number $Ul|_{AOI}$ of User Equipment on the basis of sets $\{u_{q,t}\}$ of aggregated data referred to respective reference time intervals $d_t$ comprised within the observation time interval [Ts, Te] on the day g.

In one embodiment of the invention, the step h) of estimating a number An of persons gathering within the Area of Interest having the Area of Interest radius Rs equal to the optimum radius value Ro further comprises: computing a fourth number $Up|_{AOI}$ of User Equipment as a number of User Equipment comprised within the relevant surface elements comprised in the Area of Interest having the Area of Interest radius Rs equal to the optimum radius value Ro for each day gpn of the predetermined number P of previous days preceding the day on the basis of the aggregated data $u_{q,t}$ regarding a usage of the mobile communication network.

In one embodiment of the invention, computing a fourth number $Up|_{AOI}$ of User Equipment, comprises computing each fourth number $Up|_{AOI}$ of User Equipment on the basis of sets $\{u_{q,t}\}$ of aggregated data referred to respective reference time intervals $d_t$ comprised within the observation time interval [Ts, Te] of the respective previous day gpn of the predetermined number P of previous days preceding the day g.

In one embodiment of the invention, the third number $UI|_{AOI}$ of User Equipment and/or each fourth number $Up|_{AOI}$ of User Equipment may be computed as total number, an average number, or a maximum number of User Equipment in the relevant surface elements comprised in the Area of Interest having the Area of Interest radius equal to the optimum radius value.

In one embodiment of the invention, the step h) of estimating a number An of persons gathering within the Area of Interest having the Area of Interest radius Rs equal to the optimum radius value Ro further comprises: combining the fourth number $Up|_{AOI}$ of User Equipments of each one of the previous days gpn in order to determine a further average User Equipment number $\mu|_{AOI}$, the further average User Equipment number $\mu|_{AOI}$ providing an indication of an average number of persons normally comprised within the Area of Interest having the Area of Interest radius Rs equal to the optimum radius value Ro during the considered observation time interval [Ts, Te] in any days.

In one embodiment of the invention, the step h) of estimating a number An of persons gathering within the Area of Interest having the Area of Interest radius Rs equal to the optimum radius value Ro further comprises: combining the third number $UI|_{AOI}$ of User Equipment and the further average User Equipment number $\mu|_{AOI}$ in order to obtain the number An of persons gathering in the Area of Interest having the Area of Interest radius Rs equal to the optimum radius value Ro.

In one embodiment of the invention, combining the third number $UI|_{AOI}$ of User Equipment and the further average User Equipment number $\mu|_{AOI}$ comprises subtract the further average User Equipment number $\mu|_{AOI}$ from the third number $Up|_{AOI}$ of User Equipment.

Another aspect of the present invention proposes a system coupled with a wireless telecommunication network for estimating a number of persons An gathering at an Area of Interest, the system comprising: a computation engine adapted to process data retrieved from a mobile telephony network; a repository adapted to store data regarding interactions between the User Equipment and the mobile telephony network, computation results generated by the computation engine and, possibly, any processing data generated by and/or provided to the system, and an administrator interface operable for modifying parameters and/or algorithms used by the computation engine and/or accessing data stored in the repository. Moreover, the system further comprises a memory element storing a software program product configured for implementing the method of above through the system.

In one embodiment of the invention, the system further comprises at least one user interface adapted to receive inputs from, and to provide output to a user of the system, the user comprising one or more human beings and/or one or more external computing systems subscriber of the services provided by the system.

One of the advantages of the solution according to the present invention is that it is computationally simple, involving just operations of counting and algebraic operations.

BRIEF DESCRIPTION OF THE DRAWINGS

These and others features and advantages of the solution according to the present invention will be better understood by reading the following detailed description of an embodiment thereof, provided merely by way of non-limitative examples, to be read in conjunction with the attached drawings, wherein.

DETAILED DESCRIPTION OF THE INVENTION

Figure 1:
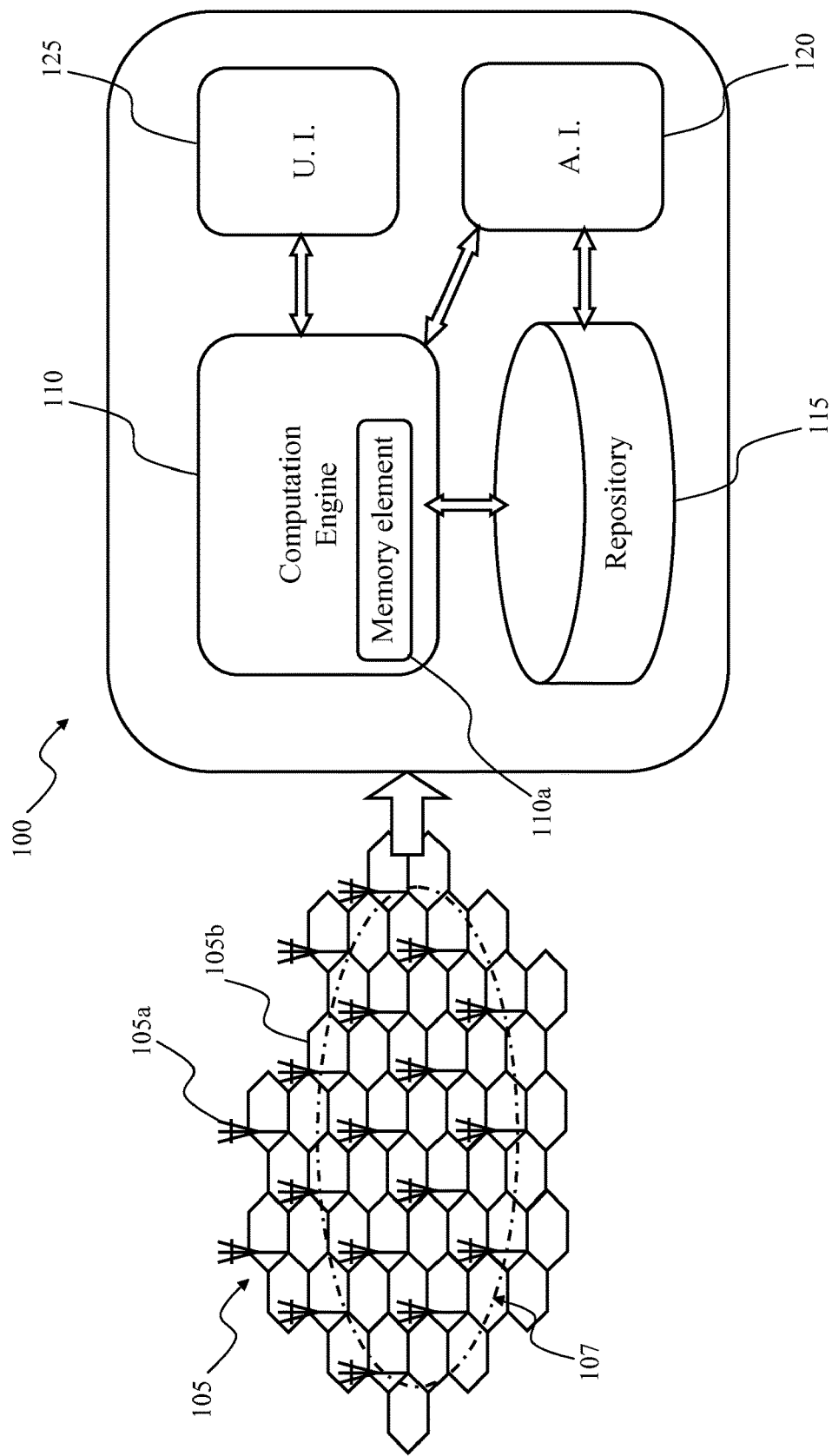
FIG. 1 is a schematic representation of a crowd estimation system according to an embodiment of the present invention.

With reference to the drawings, FIG. 1 is a schematic representation of a crowd estimation system, simply denoted as system 100 hereinafter, according to an exemplary embodiment of the present invention.

The crowd estimation system and method described in the following allow performing an estimation of a number of persons in a crowd gathered for example, in order to attend at one or more public happenings, of the most disparate nature, like for example (and non-exhaustively) live television public happenings, artistic/entertaining performances, cultural exhibitions, theatrical plays, sports contests, concerts, movies, demonstrations and so forth.

In addition, it should be understood that the crowd estimation system and method described in the following also allow performing an estimation of a number of persons in a crowd gathered for visiting a place of particular interest such as for example a museum, a monument, a historical building and so forth.

The system 100 is coupled to a mobile communication network 105, such as a (2G, 3G, 4G or higher generation) mobile telephony network.

The mobile communication network 105 is able to provide communication resources (e.g., a portion of an available communication bandwidth) to User Equipment, UE in the following (e.g. a mobile phone, a smartphone, a tablet with 2G-3G-4G connectivity, etc.) requesting them in a covered geographic region (not detailed in FIG. 1, but described in the following with reference to FIGS. 3A and 3B). In other words, UE within the covered geographic region may be served by the mobile communication network.

In one embodiment of the present invention, the covered geographic region may comprise a whole territory covered (i.e., served) by the mobile communication network 105, even though, in other embodiments of the present invention, a covered geographic region comprising only a portion of the whole territory covered by the mobile communication network 105 could be considered.

The mobile communication network 105 comprises a plurality (i.e., two or more) of communication stations 105a (e.g., radio base stations of the mobile telephony network) deployed within the covered geographic region.

Each communication station 105a is adapted to manage communications of UE (not shown, such as for example mobile phones) in one or more served areas or cells 105b (in the example at issue, three cells are served by each communication station 105a).

Accordingly, the covered geographic region comprises the area of a plurality of the cells 105b of the mobile communication network 105, for example in one embodiment of the invention the sum of the areas of all the cells 105b of the mobile communication network 105 builds up the covered geographic region.

Differently, an (geographic) Area of Interest, AoI in brief 107 schematized in FIG. 1 as the area within the dash-and-dot line 107 extends over one or more cells 105b of the mobile communication network 105. The AoI 107 is an area within which the people gathered in a crowd for example, in order to attend at one or more public happenings and whose extent is determined by the crowd estimation algorithm of the present invention (as described in the following).

The system 100 is configured for receiving from the mobile communication network 105 aggregated data regarding the usage of the mobile communication network 105 within one or more reference time intervals (as described in the following).

The term 'aggregated data', as used in the present disclosure, indicates data regarding the operation of the mobile communication network 105, such as for example a number of served UE, traffic load, number of voice calls, number of SMS transmitted, volume of binary data exchanged, etc. The aggregated data are typically used by an operator managing the mobile communication network 105 for analysing general trends or values (e.g., changes of a number of served UE over time) in the exploiting of resources (e.g., bandwidth and/or computational capabilities) of the mobile communication network 105 without identifying each single UE (and therefore the owners of the UE) that interacted with the mobile communication network 105.

Particularly, the aggregated data do not comprise any identifier of the UE served by the mobile communication network 105, therefore no indication about the UE owners identities, habits or frequented places (such as for example home and work places) may be obtained from the aggregated data provided by the mobile communication network 105, thus the privacy of the UE owners is ensured.

In one embodiment of the invention, the aggregated data acquired by the system 100 from the mobile communication network 105 comprise an indication regarding a number of UE, i.e. indicative also of a number of individuals (the UE owners), located in the covered geographic region.

The covered geographic region just described comprises the Area of Interest, AoI in brief, schematized in FIG. 1 as the area within the dash-and-dot line 107.

The AoI 107 (further described in the following) may generally comprise a core place (e.g., a stadium, a theater, a city square and so on) where a public happening, which attracts a respective crowd, is taking place and, possibly, surroundings (e.g., nearby parking lots, nearby streets, nearby transport stations and so forth) of the core place.

It should be noted that since the AoI 107 is comprised in the covered geographic region of the mobile communication network 105, thus UE within the AoI 107 may be served by the mobile communication network 105.

Preferably, the aggregated data received from the mobile communication network 105 by the system 100 comprise an indication of a number of UE served by the mobile communication network 105.

More preferably, the aggregated data received from the mobile communication network 105 by the system 100 comprise indications of the UE number served by the communication network 105 in a plurality of sub-portions, or surface elements (described in the following), of the covered geographic region. For example, each surface element may comprise one of the cells 105b, a group of two or more cells 105b, and/or portions of the cells 105b of the mobile communication network 105 (e.g., in one embodiment of the invention the surface elements may be shaped as squares having a side of 150m, therefore each one of the cells 105b comprises more than one surface element especially in extra-urban areas where cells 105b usually have a greater extent with respect to cells 105b in urban areas).

Generally, each communication station 105a of the mobile communication network 105 is adapted to interact with any UE located within one of the cells 105b served by such communication station 105a (e.g., interactions at power on/off, at location area update, at incoming/outgoing calls, at sending/receiving SMS and/or MMS, at Internet access etc.). Such interactions between UE and mobile communication network 105 will be generally denoted as events $e_i$ (i=1, . . . , I; where I is an integer) in the following.

Therefore, aggregated data comprising the indication of a number of UE may be computed by simply counting a number of UE that had at least one interaction with the mobile communication network 105. In other words, the aggregated data comprise an indication of the number of UE that produced at least an event $e_i$ with one of the communication stations 105a that provides services over respective cells 105b of the mobile communication network 105.

Alternatively, the indication of a number of UE may be based on traffic load experienced by the mobile communication network 105. Indeed, each event $e_i$ in order to be performed, requires a portion of communication resources (e.g., portions of a communication bandwidth) managed by the mobile communication network 105, i.e. each event $e_i$ produces a certain amount of traffic load. Accordingly, the aggregated data preferably provide an estimation of a number of UE on the basis of a traffic load divided by an average UE traffic load (i.e., an average traffic load generated by each UE associated with the mobile communication network 105).

In the present disclosure it is assumed that aggregated data are provided by the mobile communication network 105 periodically, e.g. at the lapse of predetermined reference time intervals (e.g., every certain number of minutes, hours, on a daily or weekly basis) according to a capability of the mobile communication network 105 of collecting, processing and providing such aggregated data.

For example, in one embodiment of the present invention, the aggregated data are collected by the mobile communication network 105 with a periodicity equal to, or lower than, fifteen (15) minutes (i.e., the reference time intervals have a duration of fifteen minutes each), which is a periodicity sustainable by computational capabilities of present mobile communication networks.

Nevertheless, the mobile communication network 105 may be configured to provide aggregated data asynchronously or, alternatively, aggregated data may be provided by a third processing module (not shown) associated with the mobile communication network 105 for receiving the data regarding operation of the mobile communication network 105 and with the system 100 for providing the aggregated data without departing from the scope of the present invention.

The system 100 comprises a computation engine 110 configured to process aggregated data retrieved from the mobile communication network 105, and a repository 115 (such as a database, a file system, etc.) configured to store aggregated data received from the mobile communication network 105, computation results generated by the computation engine 110 and, possibly, any processing data generated by and/or provided to the system 100 (generally in a binary format). The system 100 is provided with an administrator interface 120 (e.g., a computer) configured and operable to modify parameters and/or algorithms used by the computation engine 110 and/or to access data stored in the repository 115.

Preferably, the system 100 comprises one or more user interfaces 125 (e.g., a user terminal, a software running on a remote terminal connected to the system 100) adapted to receive inputs from, and to provide outputs to a user of the system 100. The term "user of the system" as used in the present disclosure may refer to one or more human beings and/or to external computing systems (such as a computer network, not shown) of a third party being subscriber of the services provided by the system 100 and enabled to access the system 100—e.g., under subscription of a contract with a service provider owner of the system 100, and typically with reduced right of access to the system 100 compared to the right of access held by an administrator of the system 100 operating through the administrator interface 120.

It should be appreciated that the system 100 may be implemented in any known manner; for example, the system 100 may comprise a single computer, or a network of distributed computers, either of physical type (e.g., with one or more main machines implementing the computation engine 110 and the repository 115 connected to other machines implementing administrator and user interfaces 120 and 125) or of virtual type (e.g., by implementing one or more virtual machines in a computer network).

Preferably, the computation engine 110 processes aggregated data (as discussed in detail below) according to a crowd estimation algorithm (described in the following) implemented by a software program product stored in a memory element 110*a* of the system 100, e.g. comprised in the computation engine 110 in the example of FIG. 1, even though the software program product could be stored in the repository 115 as well (or in any other memory element provided in the system 100).

In operation, the aggregated data may be continuously retrieved by the system 100 from the mobile communication network 105. For example, aggregated data may be transferred from the mobile communication network 105 to the system 100 as they are generated, in a sort of "push" modality.

Alternatively, aggregated data may be collected by the mobile communication network 105 with a first periodicity (e.g., every 15 minutes) and then packed and transferred to the system 100 with a second periodicity lower than the first periodicity (e.g., every hour), or only upon request by the system 100.

The aggregated data retrieved from the mobile communication network 105 are preferably stored in the repository 115, where they are made available to the computation engine 110 for processing.

The aggregated data are processed according to instructions provided by the system administrator (through the administrator interface 120), for example stored in the repository 115, and, possibly, according to instructions provided by a user (through the user interface 125), as described in the following. Finally, the computation engine 110 provides the results of the processing performed on the aggregated data to the user through the user interface 125, and optionally stores such processing results in the repository 115.

It should be further noted that the method described in the present disclosure may be implemented by using any source of data (e.g., provided by one or more among WiFi, WiMax, Bluetooth networks or combinations thereof with mobile telephony networks) from which it is possible to obtain aggregated data that could be related to a number of person within a predetermined area (e.g., the surface elements, or the AoI 107).

Turning now to FIGS. 2A-2E, they are exemplary shapes in which surface elements 205 of the covered geographic region associated with the mobile communication network 105 (i.e., the covered geographic region in which the mobile communication network 105 is able to serve the UE) may be modeled according to an embodiment of the present invention.

Figure 2D:
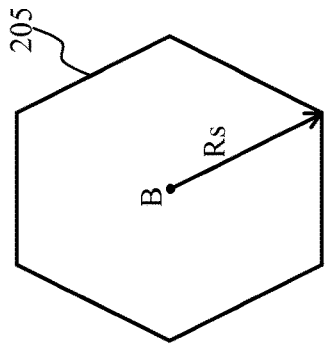
FIGS. 2A-2E are exemplary shapes that surface elements may take according to an embodiment of the present invention.
Figure 2E:
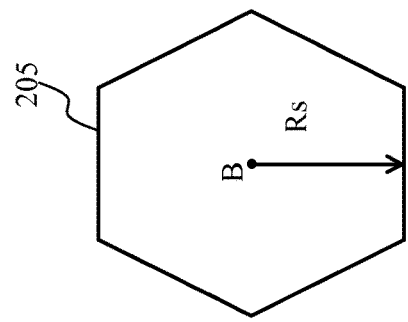
Figure 2B:
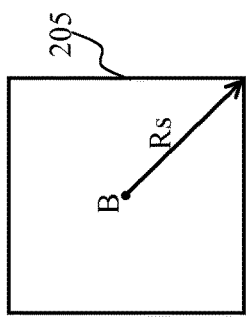
Figure 2C:
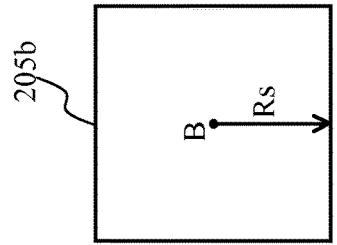
Figure 2A:
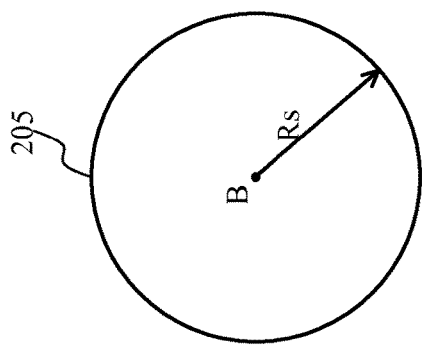

For the purposes of the present invention, each surface element 205 of the geographic region covered by the mobile communication network 105 may be modeled as a surface (as shown in FIG. 2A) having a respective surface center B and a respective surface radius Rs.

According to an embodiment of the present invention, generally the surface center B and the surface radius Rs of the surface element 205 are not related with a geographic position of the one or more communication stations 105*a* or the positions of the cells 105*b* of the mobile communication network 105.

As previously noted, the surface elements 205 may extend over one or more cells 105*b* of the mobile communication network 105, or conversely, surface elements 205 may be smaller than a cell 105*b* of the mobile communication network 105.

It should be noted that surface elements 205 are not limited to a disc-like shape, in facts, surface elements 205 may have the shape of a, preferably although not strictly necessarily regular, polygon. In this case, the surface center B corresponds to a center of mass (or centroid) of the polygon, while the surface radius Rs corresponds to a segment adjoining the center of mass of the polygon, i.e. the surface center B, with a vertex of the polygon (as shown in FIGS. 2B and 2D) or with a midpoint of a side of the polygon (as shown in FIGS. 2C and 2E).

Alternatively, the mobile communication network 105 may be modeled by means of a Voronoi tessellation diagram, in which each Voronoi cell corresponds to a surface elements 205 of the covered geographic region associated with the mobile communication network 105 (since Voronoi tessellation diagrams are well known in the art, they are not discussed further herein).

Preferably, the modeling, the list and the number of surface elements 205 of the covered geographic region associated with the mobile communication network 105 may be predetermined by the mobile communication network 105, by the system 100, or are inputted to the system 100 by the administrator through the administrator interface 120.

Figure 3B:
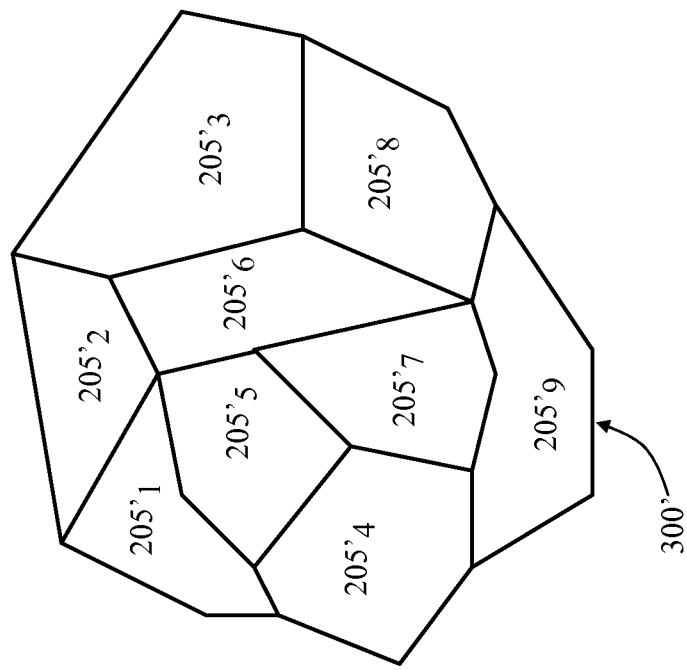
FIGS. 3A-3B are examples of covered geographic regions associated with a mobile communication network subdivided in corresponding sets of surface elements according to an embodiment of the present invention.
Figure 3A:
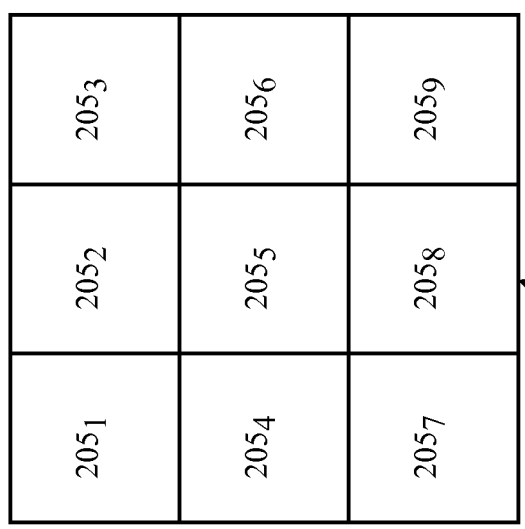

Considering FIGS. 3A and 3B, they are examples of covered geographic regions 300 and 300' associated with the mobile communication network 105 subdivided in corresponding sets of surface elements $205_{1-9}$ and $205'_{1-9}$, respectively, according to an embodiment of the present invention.

The covered geographic region 300 shown in FIG. 3A has been subdivided in nine surface elements $205_{1-9}$ having the shape of a regular polygon, i.e. a square. Conversely, the geographic region 300' shown in FIG. 3B has been subdivided in nine surface elements $205'_{1-9}$ having the shape of irregular polygons.

Generally, the geometric features of the surface elements $205_{1-9}$ and $205'_{1-9}$ may be based upon a number of parameters of the geographic region, such as for example urban features (presence and distribution of streets, wards, etc.) and/or natural features (presence and distributions of rivers, hills, etc.). Moreover, other references and/or mapping systems (such as for example well-known network planning software tools used by provider of the mobile communication network 105) may be considered for defining the shapes and sizes of the surface elements $205_{1-9}$ and $205'_{1-9}$ in addition or as an alternative to urban and natural features.

It should be noted that nothing prevents to define shapes and sizes of the surface elements $205_{1-9}$ and $205'_{1-9}$ according to a distribution of the cells 105b of the mobile communication network 105.

Furthermore, generally there are no relationships among number, shapes and sizes of the surfaces elements $205_{1-9}$ and $205'_{1-9}$ and the AoI 107.

In one embodiment of the present invention, square surface elements are preferably used such as the surface elements $205_{1-9}$ of the covered geographic region 300. Even more preferably, the surface elements $205_{1-9}$ correspond to pixels determined during the network planning by the network planning software tools mentioned above.

Indeed, square surface elements $205_{1-9}$ allow simply subdividing the covered geographic region 300, e.g. having determined a reference point (such as for example the surface center B) of a generic surface element $205_q$ (q=1, . . . , Q; where Q is a positive integer, Q=9 in the example of FIG. 3A) and the size of the sides of the square surface elements $205_{1-9}$, it is simply possible to determine the vertexes and the surface centers B of all of the surface elements $205_{1-9}$.

For example, the pixels used as surface elements may be shaped as squares having a side having a size comprised between 200 m and 50 m such as 150 m. This ensures a good trade-off between the detail level of the covered geographic region 300 and the computational complexity required to analyze the aggregated data referred to the covered geographic region 300.

According to one embodiment of the present invention, the aggregated data provided by the mobile communication network 105 comprise an indication regarding a number of UE (and therefore of UE owners) for each one of the of the surfaces elements $205_{1-9}$ and $205'_{1-9}$.

In the following, reference is made only to the coverage geographic area 300 and to the respective surface elements $205_{1-9}$ of FIG. 3A for the sake of simplicity and brevity; however, it should be noted that similar considerations may be applied to the coverage geographic area 300' and to the respective surface elements $205'_{1-9}$ of FIG. 3B as well.

In one embodiment of the invention, for each generic surface element $205_q$ the system 100 receives from the mobile communication network 105 a respective aggregated UE number $u_q$.

Preferably, the system 100 receives from the mobile communication network 105 a plurality of aggregated UE numbers $u_{q,t}$ for each generic surface element $205_q$. Each UE number $u_{q,t}$ of the aggregated UE numbers $u_{q,t}$ is referred to a t-th reference time interval of a plurality of consecutive reference time intervals $d_t$ (t=1, . . . , T; where T is a positive integer).

In other words, the system 100 receives a set $\{u_{q,t}\}$ of Q aggregated UE numbers $u_{q,t}$ (one for each one of the surface elements $205_q$; i.e., nine aggregated UE numbers $u_{q,t}$ in the example of FIG. 3A), each set being referred to a reference time interval $d_t$ of consecutive T reference time intervals $d_t$, e.g. each set $\{u_{q,t}\}$ of Q aggregated UE numbers $u_{q,t}$ is generated at time instants $t_t$ corresponding to the end of a respective time interval $d_t$.

For example, by considering an acquisition period $\Delta T$ twenty four hours long ($\Delta T=24$ hr), during which T sets $\{u_{q,t}\}$ of Q aggregated UE numbers $u_{q,t}$ are received by the system 100 for storing and/or processing (as described in the following), and time interval $d_t$ fifteen minutes long ($d_t=15$ min.), at the end of the acquisition period $\Delta T$, the system 100 has available T=96 sets $\{u_{q,t}\}$ of Q=9 aggregated UE numbers $u_{q,t}$, one for each reference time interval $d_t$. Indeed, the acquisition period $\Delta T$ is subdivided in 96 consecutive reference time intervals $d_t$ that have the following structure: $d_1=[00:00, 00:15)$, $d_2=[00:15, 00:30)$, . . . , $d_{95}=[23:30, 23:45)$, and $d_{96}=[23:45, 00:00)$.

According to an embodiment of the present invention, the aggregated UE numbers $u_{q,t}$ are computed on the basis of traffic loads of each cell 105b of the mobile communication network 105 during the corresponding reference time interval $d_t$.

Preferably, the aggregated UE number $u_{q,t}$ is computed by combining the traffic load (e.g., in Erlang) measured at each one of the cells 105b comprised in the coverage geographic area 300 during the corresponding t-th reference time interval $d_t$ with the average UE traffic load estimated for UE in the cells 105b (i.e., an average traffic load generated by each UE associated with the mobile communication network 105).

The traffic load of each cell 105b is divided by the average UE traffic load, thus obtaining an estimation of the number of UE served by each the cell 105b during the reference time interval $d_t$. Subsequently, the number of UE served by cells 105b are distributed among the surface elements $205_q$ of the covered geographic region 300.

For example, the determination (i.e., the distribution) of the number of UE within each one of the surface elements $205_q$ of the covered geographic region 300 may be based on the method described in the paper by Francesco Calabrese, Carlo Ratti: "Real Time Rome", Networks and Communications Studies 20(3-4), pages 247-258, 2006 mentioned above on the basis of the number of UE served by cells 105b.

It is pointed out that the present invention is independent from the quantity used for determining the aggregated UE number $u_{q,t}$. Indeed, aside the traffic load measured in Erlangs, other forms accounting the traffic load may be used, e.g. a number of calls per cell 105b, a number of connections per cell 105b or the number of unique UE connected per cell 105b (i.e., each referred to the corresponding t-th reference time interval $d_t$).

It is also pointed out that the present invention is independent from a function used to distribute the numbers of UE served by cells 105*b* among the surface elements 205$_q$ of the covered geographic region 300.

In another embodiment of the present invention, the mobile communication network 105 has the knowledge of the number of UE connected to each one of the cells 105*b*, therefore, there is no need to determine the number of UE through the traffic load, and the aggregated UE numbers $u_{q,t}$ may be straightforwardly determined by adding together the number of UE served by the cells 105*b* comprised in the surface element 205$_q$ during the respective reference time interval $d_t$.

Turning now to FIGS. 4A-4E, they are exemplary shapes that the AoI 107 to be determined may take according to an embodiment of the present invention.

Figure 4B:
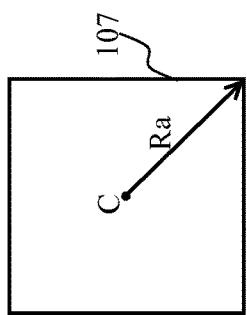
FIGS. 4A-4E are exemplary shapes that the AoI to be determined may take according to an embodiment of the present invention.
Figure 4D:
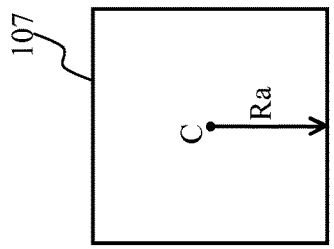

Generally, the AoI 107 of the public happening may be modeled as an area having an AoI center C and an AoI radius Ra. For example, the AoI 107 may be delimited by a circumference centered in the AoI center C and having the AoI radius Ra as circumference radius (as shown in FIG. 4A).

It should be noted that the AoI 107 may have shapes different from the circumference. For example, the AoI 107 may have the shape of a, preferably regular, polygon. In this case, the AoI center C corresponds to a center of mass (or centroid) of the polygon, while the AoI radius Ra corresponds to a segment adjoining the center of mass of the polygon with a vertex of the polygon (as shown in FIGS. 4B and 4D) or with a midpoint of a side of the polygon (as shown in FIGS. 3C and 3E) in a similar way as for the surface elements 205 modeling discussed above.

The AoI center C may be set (e.g., by a user through the user interface 125 or by a system administrator through the administrator interface 120) as a (geographical) central point of the AoI 107 (e.g., a geographical central point of the core place), as an address of the core place of the public happening, as a point provided by a mapping software, such as web mapping services (e.g., Google Maps™, OpenStreetMap™, etc.).

As will be described in more detail in the following, the AoI radius Ra may take zero or negative values along with positive values. In case the AoI radius Ra takes zero or negative values, the AoI 107 is limited to the AoI center C (i.e., the core place of the one or more public happenings). The meaning of zero or negative values for the AoI radius Ra will be further clarified by reference to such zero or negative values in the embodiments described below.

The algorithm described in the following is configured to determine an optimum radius value Ro for the AoI radius Ra of the AoI 107. In one embodiment of the invention, the optimum radius value Ro is determined by means of iterative steps starting from a minimum radius value Rmin to a maximum radius value Rmax (as described hereinbelow). Preferably, the minimum radius value Rmin and the maximum radius value Rmax are set by the administrator of the system 100 through the administrator interface 120.

In an embodiment of the present invention, on the basis of statistical analysis of empirical data regarding a plurality of past public happenings performed by the Applicant, the minimum radius value Rmin is set equal to −1500 m (Rmin=−1500 m), while the maximum radius value Rmax is set equal to 1500 m (Rmax=1500 m).

Having defined the shape of the surface elements 205 of the covered geographic region 300 covered by the mobile communication network 105 and the shape of the AoI 107, the concept of relevant surface elements, i.e., a surface elements 205*q* of the covered geographic region 300 that is considered at least partially belonging to the AoI 107 according to an embodiment of the invention will be now be introduced.

FIGS. 5A-5D are relevant served areas or surface elements 505*a-d* among the surface elements 205*q* of the covered geographic region 300 with respect to the AoI 107 according to an embodiment of the invention.

In one embodiment of the invention, given the AoI 107 having the AoI center C and the generic surface elements 205*q* having the surface center B and the surface radius Rs, the generic cell 105*b* may be considered a relevant surface element 505*a-d* for the AoI 107 if the following inequality is verified:

$$\text{Dist}(C,B) \leq |Rs+Ra|, \quad (1)$$

where Dist(C, B) is the geographical distance between the AoI center C and the surface center B.

According to the value of the AoI radius Ra of the AoI 107, inequality (1) may take three different meanings.

Namely, if the AoI radius Ra of the AoI 107 is greater than zero (i.e., Ra>0), inequality (1) reduces to:

$$\text{Dist}(C,B) \leq (Rs+Ra) \quad (2)$$

and the generic surface element 205 is considered a relevant surface element (such as the case of relevant surface elements 505*a* in FIG. 4A) for the AoI 107 having an AoI radius Ra greater than zero if the area of the AoI 107 and the generic surface element 205 are at least partially superimposed (even if the AoI center C fall outside the generic surface element 205).

Figure 4C:
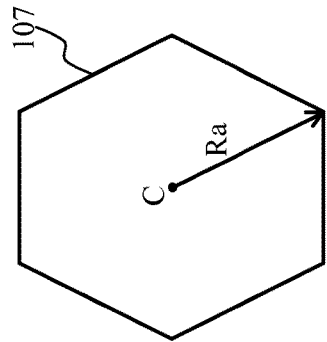
Figure 4E:
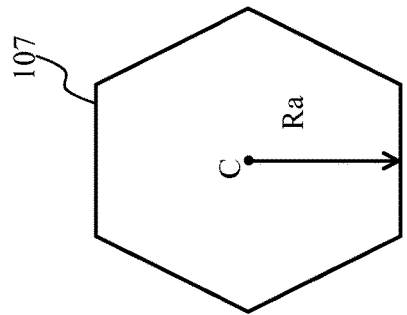
Figure 4A:
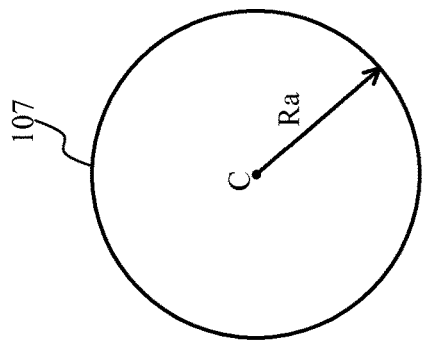
Figure 5A:
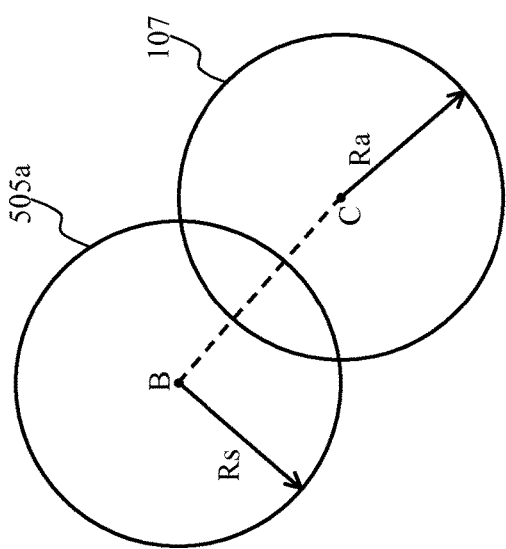
FIGS. 5A-5D are relevant surface elements among surface elements in which the covered geographic region AoI is subdivided according to an embodiment of the invention.
Figure 5B:
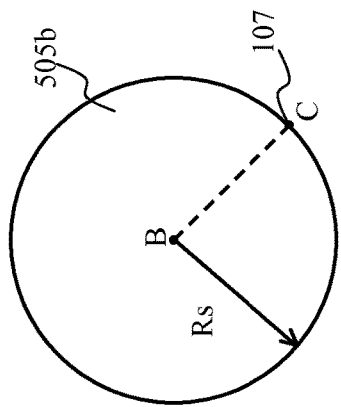
Figure 5C:
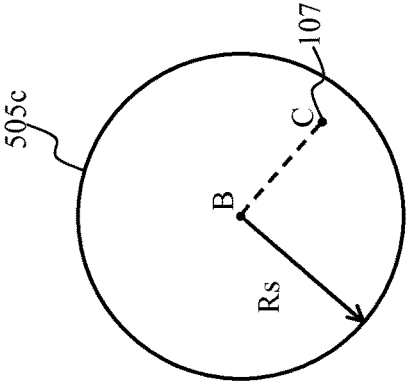
Figure 5D:
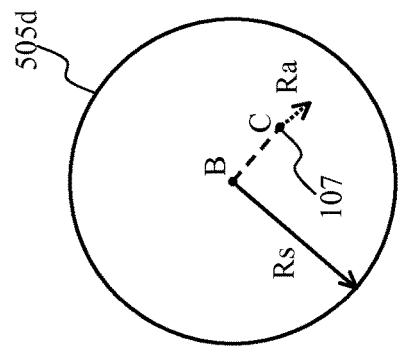

If the AoI radius Ra of the AoI 107 is equal to zero (i.e., Ra=0) the inequality (1) reduces to:

$$\text{Dist}(C,B) \leq Rs \quad (3)$$

and the generic surface elements 205*q* is considered a relevant surface element (such as the case of relevant surface elements 505*b* and 505*c* in FIGS. 4B and 4C) for the AoI 107 having an AoI radius Ra equal to zero if the AoI center C of the AoI 107 is comprised in the generic surface element 205*q*.

Finally, if the AoI radius Ra of the AoI 107 is smaller than zero (i.e., Ra<0) the generic surface element 205*q* is considered a relevant surface element (such as the case of relevant surface element 505*d* in FIG. 4D) for the AoI 107 having an AoI radius Ra smaller than zero if the AoI center C of the AoI 107 is comprised within the generic surface element 205*q* at a distance from the surface center B equal to or smaller than Rs−|Ra|.

A (generic) public happening S, apart from being held at a specific location (i.e., the AoI 107), has a start time Ts and an end time Te. Consequently, for the purposes of the present invention the public happening S has a relevant duration equal to an observation time interval [Ts, Te] (i.e., a time interval that starts at the a start time Ts and ends at the end time Te, lasting for Te−Ts time units, e.g. seconds, minutes or hours).

Both the start time Ts and the end time Te may be defined so as to correspond to the official (officially announced) start and end times scheduled for that public happening S.

Nevertheless, the Applicant has observed that by anticipating the start time Ts with respect to the official start time of the public happening S it is possible to take into account the fact that people (i.e., UE owners that attend at the public happening S) arrive at the AoI 107 before the official start time of the public happening S, which may be useful for collecting data about a trend in time of a flow of attendees arriving at the public happening S. For example, on the basis of empirical data of previous public happenings, the Applicant has found that the start time Ts may be usefully anticipated to 60 minutes before the official start time of the public happening S in order to take into account the trend of attendees arriving at the public happening S.

Similarly, the Applicant has observed that the end time Te may be delayed with respect to the official end time of the public happening S in order to take into account the fact that people leave the AoI 107 after the official end time of the public happening, which may be useful for collecting data about a trend in time of a flow of attendees leaving the public happening S. For example, on the basis of empirical data of previous public happenings, the Applicant has found that the end time Ts may be usefully delayed by 30 minutes after the official end time of the public happening S in order to take into accounts the trend of attendees leaving the public happening S.

Anyway, the administrator through the administrator interface 120, and/or the user through the user interface 125, may set any custom start time Ts and end time Te for the public happening S. For example, the start time Ts and the end time Te may be set in order to define the observation time interval [Ts, Te] shorter than the effective duration of the public happening S (shorter than the duration of the whole event) in order to analyze a number or a variation of attendees to the public happening S only during a sub-portion of the whole time duration of the public happening S.

In addition, during the course of the public happening the administrator may change in real-time the end time Te in order to obtain an instant number of attendees to the public happening S. For example, the administrator may set the end time Te to a current time instant in order to determine the number of attendees to the public happening S up to the current time instant. Moreover, the administrator may determine the number of attendees to the public happening S up at a plurality of subsequent end times Te in order to identify a trend in the number of attendees to the public happening S over time.

Figure 6A:
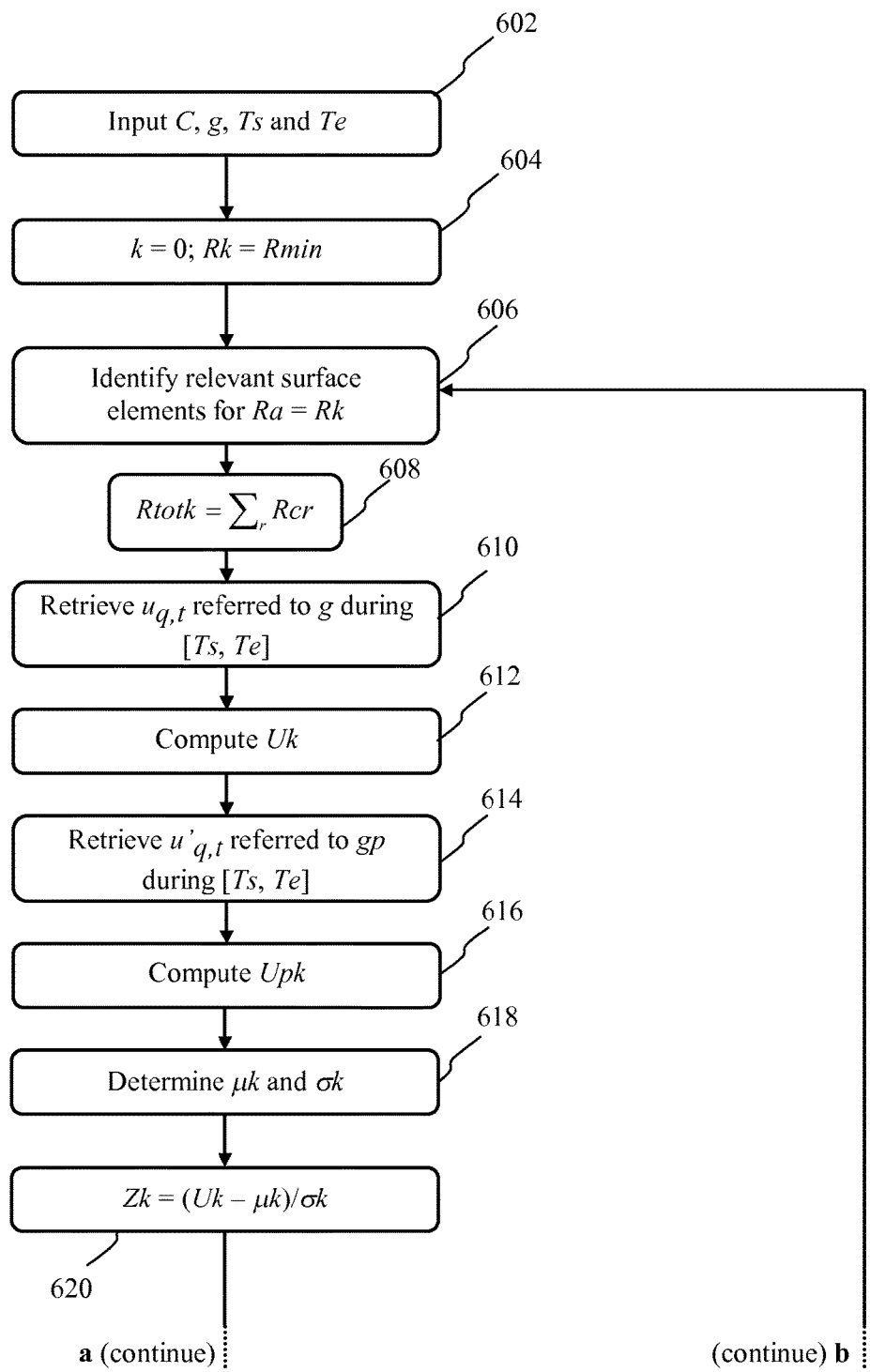
FIGS. 6A-6C are a schematic flowchart of a crowd estimation algorithm according to an embodiment of the present invention.
Figure 6B:
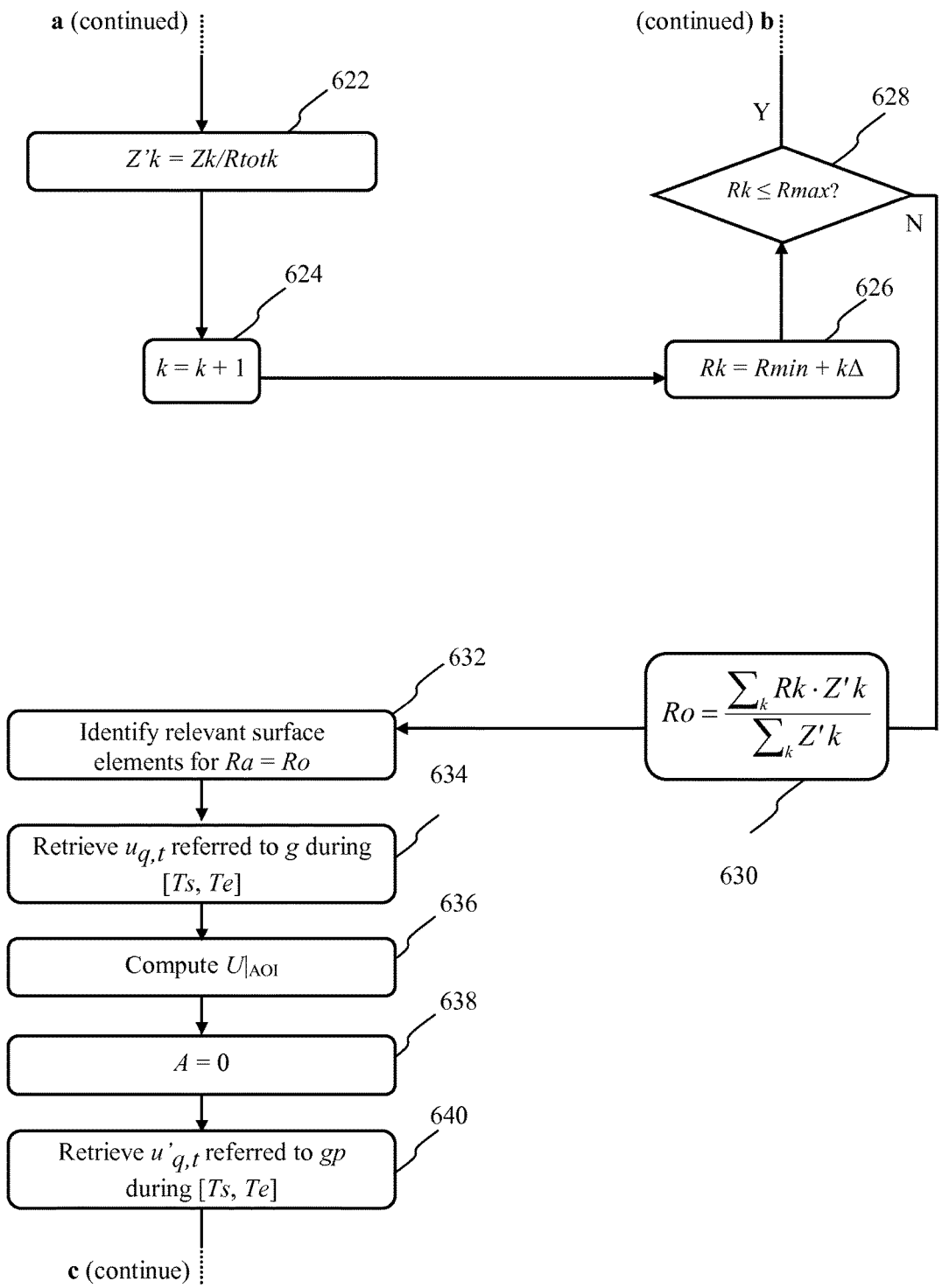
Figure 6C:
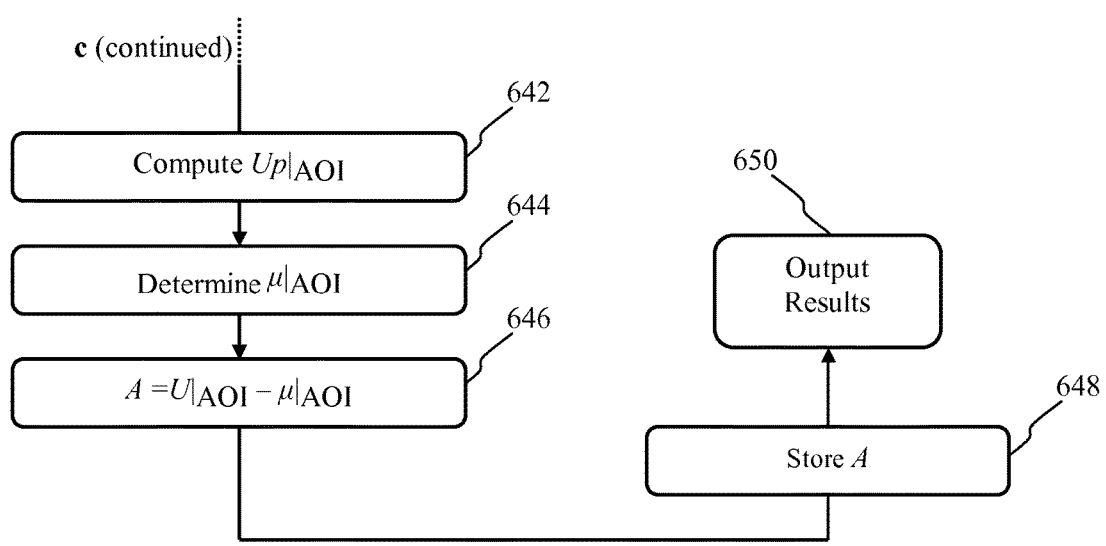

Having described the system 100 and the time (i.e., the start time Ts and the end time Te) and spatial (i.e., the AoI center C and AoI radius Ra of the AoI 107) characteristics of the public happening S, a crowd estimation algorithm (or crowd counting algorithm) according to an embodiment of the present invention will be now described, by making reference to FIGS. 6A-6C, which are a schematic block diagram thereof.

A first portion of the crowd estimation algorithm is configured to determine the optimum radius value Ro for the AoI radius Ra of the AoI 107 on the basis of the data regarding the public happening S considered.

Initially (step 602) the AoI center C, the observation day g and the start time Ts and end times Te of the public happening S are inputted to the system 100, e.g. by a user through the user interface 125 or by the administrator through the administrator interface 120.

Afterwards (step 604), an iteration variable k is initialized to zero (i.e., k=0) and a calculated radius value Rk is initially set to the minimum radius value Rmin (i.e., Rk=Rmin). The iteration variable k accounts for the number of iterations of the first portion of the algorithm.

Next (step 606), the relevant surface elements 505a-d for the AoI 107 having a AoI radius Ra equal to the calculated radius value Rk (Ra=Rk) are identified by means of the inequality (1) as described above.

Afterwards (step 608), a total radius Rtotk is computed by combining the radii Rs of the relevant surface elements 505a-d identified at previous step 606. For example, a total radius is defined simply as:

$$Rtotk = \Sigma_r Rsr, \quad (4)$$

where Rsr denotes the radius of the r-th relevant surface element 505a-d ($1 \leq r \leq R$, R being a positive integer) identified at step 606.

All the sets $\{u_{q,t}\}$ of Q aggregated UE numbers $u_{q,t}$ referred to the observation day g during an observation time interval [Ts, Te] (i.e., referred to time intervals $d_t$ comprised in the observation time interval [Ts, Te]) and referred to the relevant surface elements 505a-d determined at step 606 are retrieved (step 610) from the repository 115.

Subsequently (step 612), a first UE number Uk is computed as the number of UE in the relevant surface elements 505a-d that have been retrieved at previous step 606 on the basis of the sets $\{u_{q,t}\}$ of Q aggregated UE numbers $u_{q,t}$ (the first UE number Uk depends on the relevant surface elements and, therefore, on the calculated radius value Rk).

The first UE number Uk may be computed as a total number, an average number, or a maximum (peak) number of UE in the relevant surface elements 505a-d, for example according to a setting selected by the administrator of the system 100 through the administrator interface 120 and/or by the user of the system 100 through the user interface 125.

For example, the first UE number Uk as the total UE number in the relevant surface elements 505a-d may be computed in the following manner. Firstly, the sum of the values of aggregated UE numbers $u_{q,t}$ (determined at step 610) within each reference time intervals $d_t$ comprised in the observation time interval [Ts, Te] in all the relevant surface elements 505a-d (determined at step 606) is computed. Subsequently, a sum of the values just computed for each reference time intervals $d_t$ comprised in the observation time interval [Ts, Te] is performed. In other words, the first UE number Uk as the total UE number in the relevant surface elements 505a-d may be computed as:

$$Uk = \sum_{t \in [Ts,Te]} \left( \sum_{q \in [1,Q]} u_{q,t} \right). \quad (5a)$$

Similarly, the first UE number Uk as the average UE number in the relevant surface elements 505a-d may be computed in the following manner. Firstly, the sum of the values of aggregated UE numbers $u_{q,t}$ (determined at step 610) within each reference time intervals $d_t$ comprised in the observation time interval [Ts, Te] in all the relevant surface elements 505a-d (determined at step 606) is computed. Subsequently, a sum of the values just computed for each reference time intervals $d_t$ comprised in the observation time interval [Ts, Te] is performed. Finally, the just obtained value is divided by the number T' of reference time intervals $d_t$ comprised in the observation time interval [Ts, Te]. In other words, the first UE number Uk as the average UE number in the relevant surface elements 505a-d may be computed as:

$$Uk = \frac{1}{T'} \sum_{t \in [Ts,Te]} \left( \sum_{q \in [1,Q]} u_{q,t} \right). \quad (5b)$$

Conversely, the first UE number Uk as the maximum (peak) UE number in the relevant surface elements 505*a-d* may be computed in the following manner. Firstly, the sum of the values of aggregated UE numbers $u_{q,t}$ (determined at step 610) within each reference time intervals $d_t$ comprised in the observation time interval [Ts, Te] in all the relevant surface elements 505*a-d* (determined at step 606) is computed. Subsequently, the maximum value among the values just computed is selected as the first UE number Uk. In other words, the first UE number Uk as the maximum (peak) UE in the relevant surface elements 505*a-d* may be computed as:

$$Uk = \underset{t \in [Ts, Te]}{\text{Max}} \left( \sum_{q \in [1,Q]} u_{q,t} \right). \tag{5c}$$

It should be noted that the first UE number Uk regardless whether is computed as total number, an average number, or a maximum (peak) number of UE in the relevant surface elements 505*a-d* is always dependent on the calculated radius value Rk used to determine the relevant surface elements 505*a-d* to which the aggregated UE numbers $u_{q,t}$ are referred.

Similarly, all the sets $\{u'_{q,t}\}$ of Q aggregated UE numbers $u'_{q,t}$ referred to previous days gp preceding the observation day g during the observation time interval [Ts, Te] and having taken place within the relevant surface elements 505*a-d* determined at step 606 are retrieved (step 614) from the repository 115.

In one embodiment of the invention, for the public happening S a set of P previous days gp (where 1≤p≤P and P is an integer number) preceding the observation day g are considered. The number P of previous days gp considered is preferably set by the administrator (through the administrator interface 120). In an embodiment of the present invention, the administrator sets the number P of previous days gp according to the storage capabilities of the repository 115 (i.e., in order to be able to store all the data regarding the P previous days gp) and/or on the basis of computational capabilities of the computation engine 110 (i.e., in order to be able to process all the data regarding the P previous days gp). Preferably, the administrator sets the number P of previous days gp also on the basis of a statistical analysis of past public happenings of the same kind (i.e., cultural, entertaining, politics or sport public happenings).

The Applicant has found that setting the number P of previous days gp equal to 6 (i.e., P=6) provides good results for most kind of public happenings (although this should not be construed as limitative for the present invention).

Then (step 616), a second UE number Upk is computed, for each one of the previous days gp, as the number of UE in the relevant surface elements 505*a-d* on the basis of the sets $\{u'_{q,t}\}$ of Q aggregated UE numbers $u'_{q,t}$ referred to relevant surface elements 505*a-d* that have been retrieved at previous step 606 (the second UE number Upk depends on the relevant surface elements 505*a-d* and, therefore, on the calculated radius value Rk).

Similarly to the first UE number Uk, each one of the second UE numbers Upk may be computed as a total number, an average number, or a maximum (peak) number of UE in the relevant surface elements 505*a-d*, for example according to a setting selected by the administrator of the system 100 through the administrator interface 120 and/or by the user of the system 100 through the user interface 125.

For example, the second UE numbers Upk as the total numbers of UE in the relevant surface elements 505*a-d* may be computed in the following manner. Firstly, for each one of the previous days gp, the sum of the values of aggregated UE numbers $u'_{q,t}$ (determined at step 614) within each reference time intervals $d_t$ comprised in the observation time interval [Ts, Te] during the considered previous day gp in all the relevant surface elements 505*a-d* (determined at step 606) is computed. Subsequently, a sum of the values just computed for each reference time intervals $d_t$ comprised in the observation time interval [Ts, Te] during the considered the previous day gp is performed. In other words, the second UE number Upk for the previous day gp as the total UE number in the relevant surface elements 505*a-d* may be computed as:

$$Upk = \sum_{t \in [Ts, Te]} \left( \sum_{q \in [1,Q]} u'_{q,t} \right). \tag{6a}$$

The second UE numbers Upk as the average UE numbers in the relevant surface elements 505*a-d* may be computed in the following manner. Firstly, for each one of the previous days gp, the sum of the values of aggregated UE numbers $u'_{q,t}$ (determined at step 614) within each reference time intervals $d_t$ comprised in the observation time interval [Ts, Te] during the considered previous day gp in all the relevant surface elements 505*a-d* (determined at step 606) is computed. Subsequently, a sum of the values just computed for each reference time intervals $d_t$ comprised in the observation time interval [Ts, Te] during the considered the previous day gp is performed. Finally, the just obtained value is divided by the number T' of reference time intervals $d_t$ comprised in the observation time interval [Ts, Te] during the considered the previous day gp. In other words, the second UE numbers Upk for the previous day gp as the average UE numbers in the relevant surface elements 505*a-d* may be computed as:

$$Upk = \frac{1}{T'} \sum_{t \in [Ts, Te]} \left( \sum_{q \in [1,Q]} u'_{q,t} \right). \tag{6b}$$

The second UE numbers Upk as the maximum (peak) UE numbers in the relevant surface elements 505*a-d* may be computed in the following manner. Firstly, for each one of the previous days gp, the sum of the values of aggregated UE numbers $u'_{q,t}$ (determined at step 614) within each reference time intervals $d_t$ comprised in the observation time interval [Ts, Te] during the considered previous day gp in all the relevant surface elements 505*a-d* (determined at step 606) is computed. Subsequently, the maximum value among the values just computed is selected as the second UE number Upk for the considered previous day gp. In other words, the second UE number Upk for the considered previous day gp as the maximum (peak) UE in the relevant surface elements 505*a-d* may be computed as:

$$Upk = \underset{t \in [Ts, Te]}{\text{Max}} \left( \sum_{q \in [1,Q]} u'_{q,t} \right). \tag{6c}$$

Also in this case, the second UE numbers Upk regardless whether is computed as total number, an average number, or a maximum (peak) number of UE in the relevant surface elements 505a-d are always dependent on the calculated radius value Rk used to determine the relevant surface elements 505a-d to which the aggregated UE numbers $u_{q,t}$ are referred.

The second UE numbers Upk just computed are combined (step 618) in order to determine an average UE number μk (with $$\mu k = \sum_{p=1}^{P} Upk,$$

thus the average UE number μk is clearly different from the second UE numbers Upk even if they are computed as the average number of UE in the relevant surface elements 505a-d) and a UE number standard deviation σk (with $$\sigma k = \sqrt{\left(\frac{\sum_{p=1}^{P}(Upk - \mu k)^2}{P}\right)}$$

of the UE numbers within the relevant surface elements 505a-d during the P previous days gp considered.

The average UE number pk and the UE number standard deviation σk are combined (step 620) with the first UE number Uk in order to obtain a (statistical) quantity defined z-score Zk (which depends on the calculated radius value Rk):

$$Zk=(Uk-\mu k)/\sigma k. \quad (7)$$

The z-score Zk just computed is normalized (step 622) with respect to the total radius Rtotk computed at step 608:

$$Z'k=Zk/Rtotk \quad (8)$$

Next, the variable k is increased by unity (step 624; i.e., k=k+1) and the calculated radius value Rk is increased (step 626):

$$Rk=Rmin+k\Delta, \quad (9)$$

where Δ is an iteration step or width that may be defined by the administrator (e.g., Δ=100 m), thus each calculated radius value Rk is separated from the next calculated radius value by an iteration width Δ. It should be noted that the iteration width Δ define a maximum iteration value kmax for the iteration variable k—and, therefore, a maximum number of iteration for determining the optimum radius value Ro—as:

$$kmax=(|Rmin|+Rmax)/\Delta. \quad (10)$$

It should be noted that the iteration width Δ may be used by the system administrator to adjust a granularity (i.e., fineness) with which the optimum radius value Ro is determined, i.e. the smaller the iteration width Δ set by the administrator the higher the number of iterations defined by the maximum iteration value kmax and, thus, the finer a granularity of the algorithm.

In an embodiment of the present invention, since the minimum radius value Rmin is set to −1500 m, the maximum radius value Rmax is set to 1500 m and the iteration width Δ is set to 100 m the maximum iteration value kmax for the iteration variable k results to be equal to 30 and, therefore, the maximum number of iterations for determining the optimum radius value Ro is limited to 30.

Afterwards, it is checked (step 628) whether the calculated radius value Rk is lower than, or equal to, the maximum radius value Rmax:

$$Rk \leq Rmax. \quad (11)$$

In the affirmative case (exit branch Y of decision block 628), i.e. the calculated radius value Rk is lower than, or equal to, the maximum radius value Rmax (i.e., Rk≤Rmax) operation returns to step 606 for starting a new iteration of the first portion of the algorithm based on the calculated radius value Rk just increased (at step 626) by a further k-th iteration width Δ.

In the negative case (exit branch N of decision block 628), i.e. the calculated radius value Rk is greater than the maximum radius value Rmax (i.e., Rk≥Rmax), the optimum radius value Ro is computed (step 630) as the average of the computed radius values Rk (with 1≤k≤kmax) weighted by the normalized z-score Z'k computed at, or:

$$Ro = \frac{\sum_{k} Rk \cdot Z'k}{\sum_{k} Z'k}. \quad (12)$$

The steps 606 to 628 of the first portion of the algorithm are iterated until the calculated radius value Rk is greater than the maximum radius value Rmax (i.e., Rk>Rmax), and the optimum radius value Ro is computed (at step 630).

With the computation of the optimum radius value Ro at step 630 the first portion of the algorithm ends and a second portion of the algorithm starts (at step 632, described in the following). At the end of the first portion of the algorithm, the AoI 107 is properly defined by the AoI center C and by the AoI radius Ra set equal to the optimum radius value Ro (Ra=Ro).

The second portion of the algorithm according to an embodiment of the present invention is configured to determine a number of people that is attending at the public happening S.

After the optimum radius value Ro has been computed at step 630, a set of actually relevant surface elements 505a-d is defined (step 632). This set includes all the surface elements 205 of the mobile communication network 105 for which inequality (1) is verified when the AoI radius Ra is set equal to the optimum radius value Ro, or:

$$Dist(C,B) \leq |Rs+Ro|. \quad (13)$$

Then (step 634), all the sets $\{u_{q,t}\}$ of Q aggregated UE numbers $u_{q,t}$ referred to the observation day g during the observation time interval [Ts, Te] and having taken place within the actually relevant surface elements 505a-d determined at step 632 are retrieved from the repository 115.

Subsequently (step 636), a third UE number $UI_{AOI}$ is computed as a number of UE comprised within the relevant surface elements 505a-d comprised in the AoI 107 having the AoI radius Ra equal to the optimum radius value Ro during the observation time interval [Ts, Te] on the basis of the sets $\{u_{q,t}\}$ that have been retrieved at step 632.

Similarly to the first UE number Uk, the third UE number $UI_{AOI}$ may be computed as a total number, an average number, or a maximum (peak) number of UE in the relevant surface elements 505a-d, for example according to a setting selected by the administrator of the system 100 through the administrator interface 120 and/or by the user of the system 100 through the user interface 125. It should be noted that, in this case, the third UE number $UI_{AOI}$ is computed either as a total number, an average number, or a maximum (peak) number of UE in the relevant surface elements 505a-d within the AoI 107 having the AoI radius Ra equal to the optimum radius value Ro, thus the third UE number $U|_{AoI}$, is dependent on the optimum radius value Ro rather than on the calculated radius value Rk (on which the first UE number Uk is dependent).

Once the third UE number $U|_{AoI}$ has been computed, a persons number A is initialized to zero (i.e., A=0) (step 638). The persons number A accounts for the number of people in the crowd, e.g. attendees at the public happening S (as described in the following).

All the sets $\{u'_{q,t}\}$ referred to each one of the previous days gp within the observation time interval [Ts, Te] and having taken place in the actually relevant surface element 505a-d determined at step 632 are retrieved (step 640) from the repository 115.

Then (step 642), a fourth UE number $Up|_{AoI}$ is computed for each one of the P previous days gp as a number of UE comprised within the relevant surface elements 505a-d comprised in the AoI 107 having the AoI radius Ra equal to the optimum radius value Ro during the observation time interval [Ts, Te] on the basis of the sets $\{u'_{q,t}\}$ that have been retrieved at step 640.

Also in this case, similarly to the second UE numbers Upk, each one of the fourth UE numbers $Up|_{AoI}$ may be computed as a total number, an average number, or a maximum (peak) number of UE in the relevant surface elements 505a-d, for example according to a setting selected by the administrator of the system 100 through the administrator interface 120 and/or by the user of the system 100 through the user interface 125. It should be noted that, in this case, the fourth UE numbers $Up|_{AoI}$ are computed either as a total number, an average number, or a maximum (peak) number of UE in the relevant surface elements 505a-d within the AoI 107 having the AoI radius Ra equal to the optimum radius value Ro; thus the fourth UE numbers $Up|_{AoI}$, are dependent on the optimum radius value Ro rather than on the calculated radius value Rk (on which the second UE numbers Upk are dependent).

The fourth UE numbers $Up|_{AoI}$ just computed are combined (step 644) in order to determine a further average UE number $\mu|_{AoI}$ of the UE number within the relevant surface elements 505a-d. For example the further average UE number $\mu|_{AoI}$ may be computed as:

$$\mu|_{AoI} = \sum_{p=1}^{P} Up|_{AoI}. \quad (14)$$

The further average UE number $\mu|_{AoI}$ provides an indication of an average number of persons normally comprised within the AoI 107 having the AoI radius Ra equal to the optimum radius value Ro during the considered observation time interval [Ts, Te] (i.e., people that do not gathers in the crowd).

It is pointed out that, while the further average UE number $\mu n|_{AoI}$ computed as described above may provided a sort of limited accuracy (since two or more activities from a same UE within the considered observation time interval [Ts, Te] may be considered as each belonging to different UE), the further average UE number $\mu n|_{AoI}$ provides an estimation of the average number of persons normally comprised within the AoI 107 having a satisfying accuracy provided with a low computational complexity and ensuring a full respect of the privacy of UE owners.

The person number A is then calculated (step 646) by combining (e.g., subtracting) the further average UE number $\mu|_{AoI}$ determined at step 644 with the third UE number $U|_{AoI}$ determined at step 636, or $$A = U|_{AoI} - \mu|_{AoI}. \quad (15)$$

The person number A referred to the public happening S held on the observation day g is stored (step 648) in the repository 115.

Preferably, the crowd estimation algorithm is terminated with the provision (step 650) of the results, i.e. the persons number A to the user through the user terminal 125 for inspection and/or further processing.

Advantageously, the crowd estimation algorithm according to the present invention may be configured to (possibly automatically) update in real time the persons number A during the whole duration of the gathering of people in the crowds. For example, the persons number A may be updated (either periodically or asynchronously) each time new aggregated data are provided to the system 100 by the mobile communication network 105.

In summary, the crowd estimation algorithm (or crowd counting algorithm) comprises a first portion and a second portion.

The first portion of the crowd estimation algorithm comprises a first cycle that scans (steps 608-628) all the computed radius values Rk between the minimum radius value Rmin and the maximum radius value Rmax public happening. For each computed radius value Rk respective relevant surface elements 505a-d and a normalized z-score Z'k are determined. On the basis of such data (i.e., respective relevant surface elements 505a-d and the normalized z-score Z'k) the optimum radius value Ro is identified. At the end of the first portion of the crowd estimation algorithm, the AoI 107 having the optimum radius value Ro is defined.

The second portion of the crowd estimation algorithm computes the number of UE (i.e., the third number $U|_{AoI}$) in the relevant surface elements 505a-d (i.e., comprised in the AoI 107) during the observation time interval [Ts, Te] in the observation day g, computes the number of UE (i.e., the fourth number $Up|_{AoI}$) in the same relevant surface elements 505a-d (i.e., comprised in the AoI 107) during the observation time interval [Ts, Te] in each one of the P previous days gp, an average number of the latter (i.e., the further average number $\mu|_{AoI}$) and, eventually, the number of person gathering in a crowd (i.e., the persons number A) on the basis of the numbers of UE in the relevant surface elements 505a-d during the observation time interval [Ts, Te] in the observation day g and the average number of the UE.

The crowd estimation system 100 and the crowd estimation algorithm according to an embodiment of the present invention allows a real-time computing of the number of persons gathering in a crowd, e.g. for attending at a public happening S, in a reliable way and properly identifying (by determining the optimum radius value Ro) an effective extension of AoI 107 associated with the public happening S.

The invention claimed is:

1. A method of estimating a number of persons gathering at an Area of Interest during a time interval on a day, wherein the Area of Interest is defined by an Area of Interest center and an Area of Interest radius and is covered by a mobile telecommunication network including a plurality of communication stations each of which is configured to manage communications of user equipment in one or more served areas in a covered geographic region over which the mobile telecommunication network provides services, the method comprising:

a) subdividing the covered geographic region in a plurality of surface elements corresponding to cells of the mobile telecommunication network;

b) defining a plurality of calculated radius values of the Area of interest radius, and, for each calculated radius value:

c) identifying a number of relevant surface elements of the covered geographic region within the Area of interest;

d) computing a first number of User Equipment served by the mobile communication network during the time interval on the day within the Area of Interest based on aggregated data indicating a ratio between traffic load and average user equipment traffic load of the mobile communication network;

e) computing a second number of User Equipment served by the mobile communication network during the time interval for each day of a predetermined number of previous days preceding the day within the Area of Interest based on the aggregated data;

f) combining the first number of User Equipment and the second numbers of User Equipment to obtain a statistical quantity;

g) normalizing the statistical quantity to obtain a normalized statistical quantity, the statistical quantity being normalized with respect to the radii of the relevant served areas;

h) computing an optimum radius value of the Area of Interest radius as an average of the calculated radius values weighted by the normalized statistical quantity;

i) estimating the number of persons gathering within the Area of Interest having the Area of Interest radius equal to the optimum radius value.

2. The method according to claim 1, wherein a surface element is identified as a relevant surface element if it verifies the following inequality:

$$Dist(C,B) \leq |Rs + Rk|,$$

wherein C is the center of the Area of Interest, β is the center of the surface element, Dist(C, B) is the geographical distance between the center of the Area of Interest C and the center of the surface element B, Rs is the radius of the surface element, and Rk is the calculated radius value.

3. The method according to claim 1, further comprising for each calculated radius value:

j) receiving a plurality of aggregated data indicating ratios between traffic loads and average user equipment traffic loads referred to each one of the surface elements.

4. The method according to claim 3, wherein j) receiving the plurality of aggregated data for each one of the surface elements, comprises:

receiving a set of aggregated data, each aggregated data of the set of the aggregated data being referred to a respective reference time interval which is a portion of an acquisition period during which aggregated data are collected.

5. The method according to claim 4, wherein the c) computing a first number of User Equipment served by the mobile communication network during the observation time interval on the day within the Area of Interest based on the aggregated data regarding, comprises:

computing a first number of User Equipment on the basis of sets of aggregated data referred to respective reference time intervals comprised within the observation time interval on the day; and wherein the d) computing a second number of User Equipment that has been served by the mobile communication network during the observation time interval for each day of a predetermined number of previous days preceding the day within the Area of Interest based on the aggregated data, comprises:

computing each second number of User Equipment on the basis of sets of aggregated data referred to respective reference time intervals within the observation time interval of the respective previous day of the predetermined number of previous days preceding the day.

6. The method according to claim 5, wherein the first number of User Equipment and/or each second number of User Equipment may be computed as a total number, an average number, or a maximum number of User Equipment in the relevant surface elements in the Area of Interest.

7. The method according to claim 1, wherein the e) combining the first number of User Equipment and the second numbers of User Equipment for obtaining a statistical quantity comprises:

combining the second number of User Equipment of each one of the previous days to determine an average User Equipment number and a User Equipment number standard deviation.

8. The method according to claim 7, wherein the e) combining the first number of User Equipment and the second numbers of User Equipment for obtaining a statistical quantity further comprises:

computing the statistical quantity as:

$$Zk = (Uk - \mu k)/\sigma k,$$

wherein Uk is the first number of User Equipment, μk is the average User Equipment number, and σk is the User Equipment number standard deviation.

9. The method according to claim 1, wherein the plurality of calculated radius values ranges from a minimum radius value to a maximum radius value, each calculated radius value being separated from a next radius value by an iteration width.

10. The method according to claim 1, wherein the h) estimating a number of persons gathering within the Area of Interest having the Area of Interest radius equal to the optimum radius value comprises:

k) defining a number of relevant surface elements among the surface elements in the covered geographic region, wherein the relevant surface elements are surface elements at least partially superimposed on the Area of Interest having the Area of Interest radius equal to the optimum radius value.

11. The method according to claim 10, wherein a surface element is identified as a relevant surface element if it verifies the following inequality:

$$Dist(C, B) \leq |Rs + Ro|,$$

wherein C is the center of the Area of Interest, β is the center of the surface element, Dist(C, B) is the geographical distance between the center of the Area of Interest C and the center of the surface element B, Rs is the radius of the surface element, and Ro is the optimum radius value.

12. The method according to claim 10, wherein the i) estimating a number of persons gathering within the Area of Interest having the Area of Interest radius equal to the optimum radius value further comprises:

computing a third number of User Equipment as a number of User Equipment within the relevant surface elements in the Area of Interest having the Area of interest radius equal to the optimum radius value during the time interval on the basis of the aggregated data regarding a usage of the mobile communication network.

13. The method according to claim 12, wherein computing a third number of User Equipment, comprises:

computing the third number of User Equipment on the basis of sets of aggregated data referred to respective reference time intervals within the observation time interval on the day.

14. The method according to claim 12, wherein the third number of User Equipment and/or each fourth number of User Equipment may be computed as a total number, an average number, or a maximum number of User Equipment in the relevant surface elements in the Area of Interest having the Area of Interest radius equal to the optimum radius value.

15. The method according to claim 10, wherein the i) estimating a number of persons gathering within the Area of Interest having the Area of Interest radius equal to the optimum radius value further comprises:

computing a fourth number of User Equipment as a number of User Equipment within the relevant surface elements in the Area of Interest having the Area of Interest radius equal to the optimum radius value for each day of the predetermined number of previous days preceding the day on the basis of the aggregated data.

16. The method according to claim 15, wherein computing a fourth number of User Equipment, comprises:

computing each fourth number of User Equipment on the basis of sets of aggregated-data referred to respective reference time intervals within the observation time interval of the respective previous day of the predetermined number of previous days preceding the day.

17. The method according to claim 15, wherein the i) estimating a number of persons gathering within the Area of Interest having the Area of Interest radius equal to the optimum radius value further comprises:

combining the fourth number of User Equipments of each one of the previous days to determine a further average User Equipment number, the further average User Equipment number providing an indication of an average number of persons normally comprised within the Area of Interest having the Area of Interest radius equal to the optimum radius values during the considered observation time interval in any days.

18. The method according to claim 17, wherein the i) estimating a number of persons gathering within the Area of Interest having the Area of Interest radius equal to the optimum radius value further comprises:

combining the third number of User Equipment and the further average User Equipment number in order to obtain the number of persons gathering in the Area of Interest having the Area of Interest radius equal to the optimum radius value.

19. The method according to claim 18, wherein the combining the third number of User Equipment and the further average User Equipment number comprises subtracting the further average User Equipment number from the third number of User Equipment.

20. A system coupled with a wireless telecommunication network for estimating a number of persons gathering at an Area of Interest, the system comprising:

a computation engine configured to process data retrieved from a mobile telephony network;

a repository configured to store data regarding interactions between the User Equipment and the mobile telephony network, computation results generated by the computation engine and processing data generated by and/or provided to the system;

an administrator interface configured to modify parameters and/or algorithms used by the computation engine and/or accessing data stored in the repository;

a memory element storing a software program product configured to implement the method of claim 1 through the system.

21. The system according to claim 20, further comprising at least one user interface configured to receive inputs from, and to provide output to a user of the system, the user comprising one or more human beings and/or one or more external computing systems subscriber of the services provided by the system.

\* \* \* \* \*